(12) United States Patent
Kaźmierski et al.

(10) Patent No.: US 12,641,009 B2
(45) Date of Patent: May 26, 2026

(54) SYSTEMS AND METHODS FOR DETERMINING SUSTAINABILITY FACTORS FOR ETHERNET LINKS

(71) Applicant: Cisco Technology, Inc., San Jose, CA (US)

(72) Inventors: Mariusz Kaźmierski, Wieliczka (PL); Sunil Pareek, Bengaluru (IN)

(73) Assignee: Cisco Technology, Inc., San Jose, CA (US)

( * ) Notice: Subject to any disclaimer, the term of this patent is extended or adjusted under 35 U.S.C. 154(b) by 205 days.

(21) Appl. No.: 18/657,981

(22) Filed: May 8, 2024

(65) Prior Publication Data

US 2025/0350553 A1    Nov. 13, 2025

(51) Int. Cl.
H04L 45/24         (2022.01)
H04L 43/0882      (2022.01)
H04L 45/02         (2022.01)

(52) U.S. Cl.
CPC ........ H04L 45/245 (2013.01); H04L 43/0882 (2013.01); H04L 45/04 (2013.01)

(58) Field of Classification Search
CPC ... H04L 45/245; H04L 43/0882; H04L 45/04; H04L 47/125
See application file for complete search history.

(56) References Cited

U.S. PATENT DOCUMENTS

| | | | |
|---|---|---|---|
| 9,223,377 B1 | 12/2015 | Nachum | |
| 11,528,157 B1 * | 12/2022 | Patel ................... | H04L 12/1886 |
| 2008/0304519 A1 | 12/2008 | Koenen et al. | |
| 2010/0011230 A1 | 1/2010 | Mater | |
| 2013/0003559 A1 | 1/2013 | Matthews | |
| 2015/0063125 A1 | 3/2015 | Brock | |
| 2017/0147884 A1 * | 5/2017 | Lorenzoni ................. | G01J 5/12 |
| 2021/0306250 A1 * | 9/2021 | Venkatraman .......... | H04L 69/14 |
| 2021/0378046 A1 * | 12/2021 | Shimoda ............ | H04B 7/06964 |
| 2022/0353176 A1 * | 11/2022 | Gao ........................ | H04L 45/58 |
| 2022/0407798 A1 * | 12/2022 | Holness ................. | H04L 45/24 |
| 2023/0073266 A1 * | 3/2023 | Boutros ................. | H04L 12/44 |
| 2024/0405826 A1 * | 12/2024 | Ly ........................ | H04L 5/0053 |

* cited by examiner

*Primary Examiner* — Michael A Keller
*Assistant Examiner* — Thao D Duong
(74) *Attorney, Agent, or Firm* — Baker Botts L.L.P.

(57)         ABSTRACT

In one embodiment, a method may determine collective load data from a plurality of Ethernet Virtual Private Network (EVPN) leaf nodes in a Link Aggregation Group (LAG) within a network. The LAG may include a plurality of physical Ethernet links. The method may distribute the collective load data between the plurality of EVPN leaf nodes in the LAG. The method may determine, using a de-powering algorithm, a sustainability factor for a particular physical Ethernet link of the plurality of physical Ethernet links in in the LAG. The method may determine whether to activate or de-power the particular physical Ethernet link in response to comparing the sustainability factor to a predetermined threshold.

20 Claims, 5 Drawing Sheets

100 —

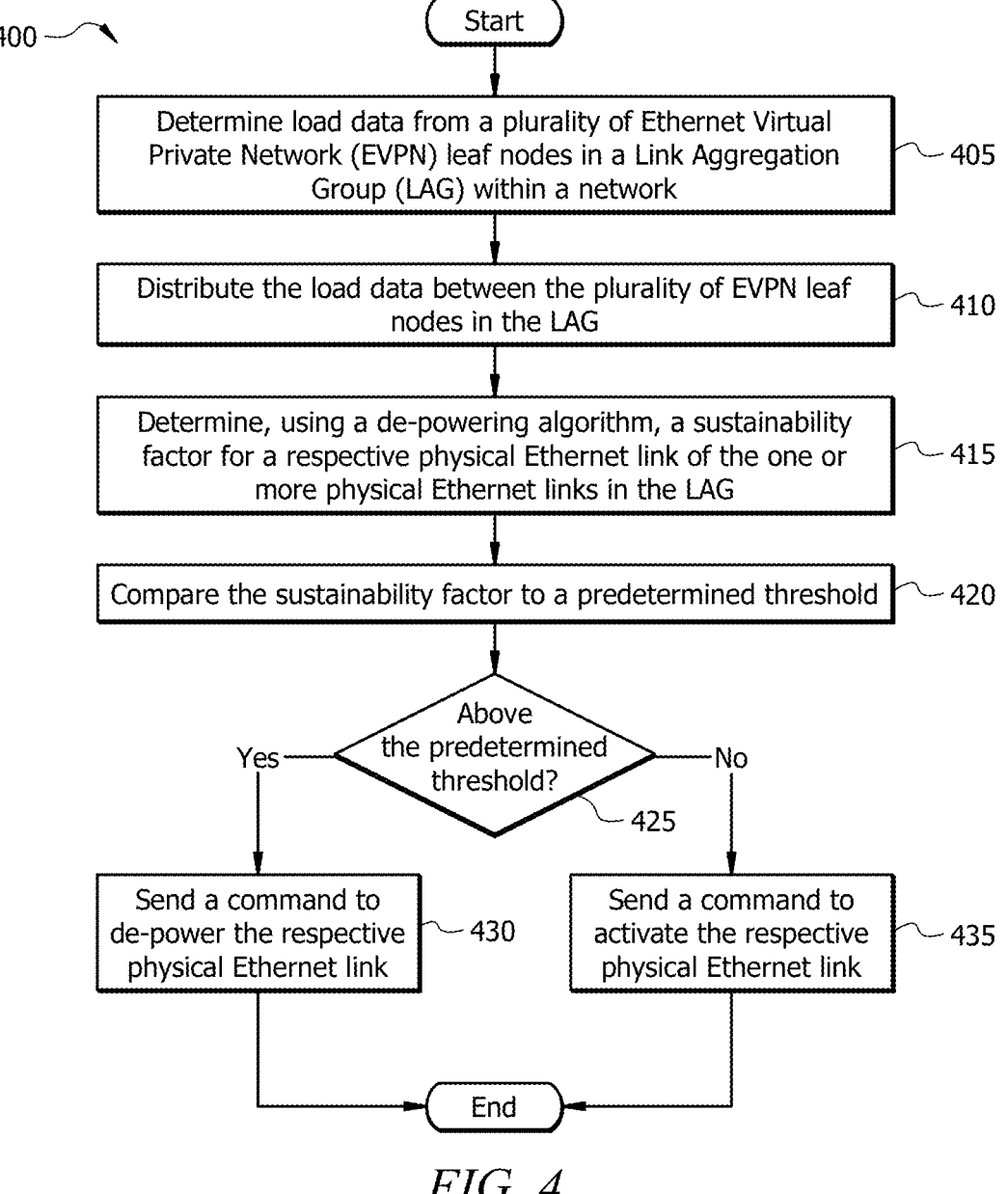

400

Start

Determine load data from a plurality of Ethernet Virtual Private Network (EVPN) leaf nodes in a Link Aggregation Group (LAG) within a network — 405

Distribute the load data between the plurality of EVPN leaf nodes in the LAG — 410

Determine, using a de-powering algorithm, a sustainability factor for a respective physical Ethernet link of the one or more physical Ethernet links in the LAG — 415

Compare the sustainability factor to a predetermined threshold — 420

Above the predetermined threshold? — 425

Yes

No

Send a command to de-power the respective physical Ethernet link — 430

Send a command to activate the respective physical Ethernet link — 435

End

*FIG. 4*

SYSTEMS AND METHODS FOR DETERMINING SUSTAINABILITY FACTORS FOR ETHERNET LINKS

TECHNICAL FIELD

The present disclosure relates generally to a field of communication networks, and more particularly, to the utilization of methods, apparatuses and systems to determine sustainability factors for ethernet links.

BACKGROUND

Ethernet Virtual Private Network (EVPN) multihoming provides a vital technology which employs multiple physical links and Internet Protocol (IP) addresses to achieve redundancy and distribute the network in a modern data center. For example, users may connect to the modern data center network using multiple physical links from different switches. If a physical link fails, the network may automatically switch to a backup to ensure seamless connectivity. Ethernet link aggregation may be used to add new links to bundle interfaces and to increase bandwidth in the modern data center network. Thus, link aggregation may significantly increase a network's availability by providing a redundant path or paths which traffic may utilize in the event of a link failure. Link aggregation has a variety of other applications which remain highly relevant in the modern data center network. For example, link aggregation may be used to increase the bandwidth available between network nodes in the network.

Computers and switches in the modern data center network consume electricity and power for under-utilized links. If a computer or switch requires more bandwidth or needs fail-over Ethernet links, one possible solution is a Link Aggregation Group (LAG). The administrators of the network (often the Information Technology staff) aggregate several Ethernet links together into a Link Aggregation Group (LAG) as defined in the IEEE 802.3ad standards. By setting up a LAG and utilizing these standards, the network will seemingly run on what looks like a single Media Access Controller (MAC) that distributes and load balances the Ethernet packets between the set of links in the LAG. Ethernet Switch Identifier (ESI) is a mandatory attribute which refers to the set of Ethernet links which connect one or more client devices, such as end-point devices, to a pair of peers, such as leaf nodes, which are connected with each other in the modern data center network. ESI LAGs allow one or more client devices to form a logical LAG interface with the peers. ESI is configured on multiple EVPN leaf nodes to which a single end-point device is connected, to allow a "single-active" or an "all-active" link LAG scenario. As a result, the EVPN LAG multihoming solution allows an end-point device to connect to more than one EVPN leaf node, increasing overall redundancy and network resiliency. Currently, all the links in a LAG are in a full or near full power state.

BRIEF DESCRIPTION OF THE DRAWINGS

FIG. 4 illustrates a method for de-powering or activating an Ethernet link in an EVPN LAG multihoming environment, in accordance with certain embodiments.

DESCRIPTION OF EXAMPLE EMBODIMENTS

Overview

Figure 1:
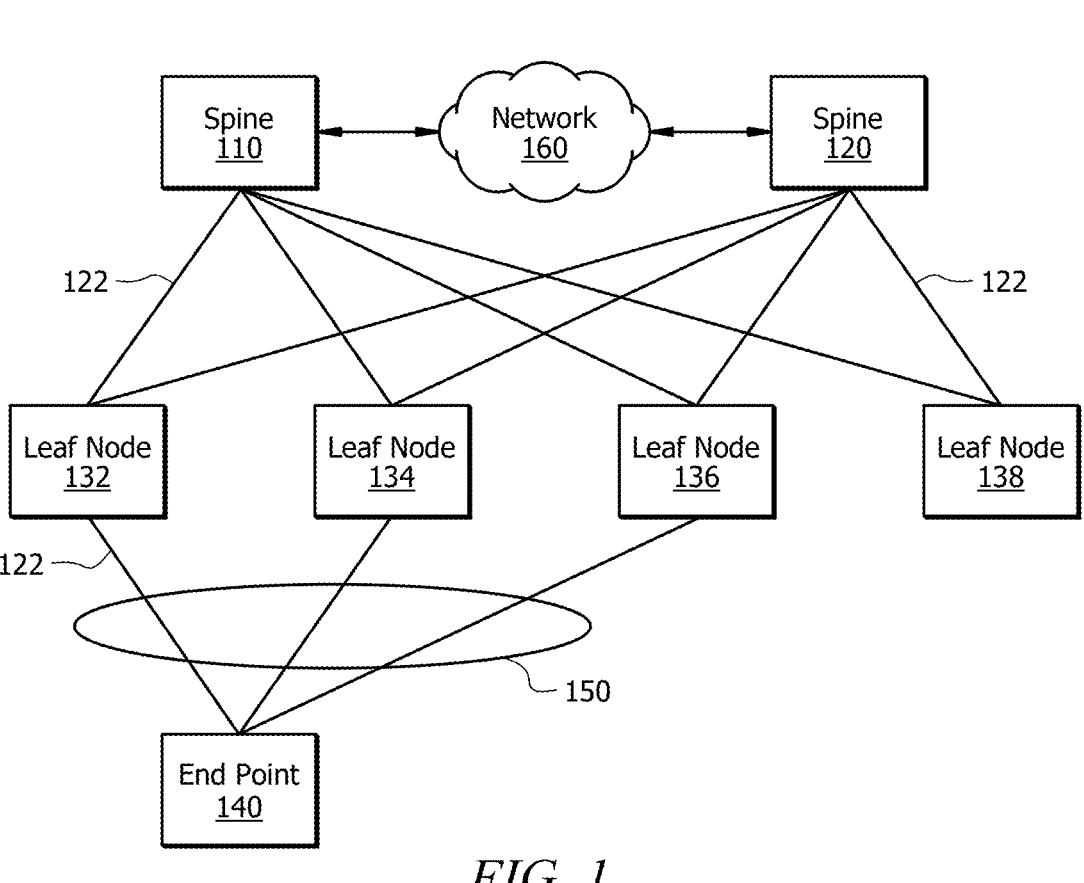
FIG. 1 illustrates an EVPN network for determining sustainability factors for Ethernet links, in accordance with certain embodiments.

In one or more embodiments, an apparatus may include one or more processors and one or more computer-readable non-transitory storage media including instructions that, when executed by the one or more processors, cause one or more components of the apparatus to perform operations. The operations include determining collective load data from a plurality of EVPN leaf nodes in a LAG within a network, the LAG including a plurality of physical Ethernet links. The operations further include distributing the collective load data between the plurality of EVPN leaf nodes in the LAG. The operations further include determining, using a de-powering algorithm, a sustainability factor for a particular physical Ethernet link of the plurality of physical Ethernet links in the LAG. The operations further include determining whether to activate or de-power the particular physical Ethernet link in response to comparing the sustainability factor to a predetermined threshold.

In one or more embodiments, the particular physical Ethernet link is associated with a particular EVPN leaf node of the plurality of EVPN leaf nodes. The operations further include calculating first load data of a particular EVPN leaf node of the plurality of EVPN leaf nodes in a distributed mode by using interface statistics and flow data associate with one or more interfaces of the particular EVPN leaf node. The operations further include receiving first load data of a particular EVPN leaf node in a centralized mode by requesting the first load data of the particular EVPN leaf node from an assurance engine. The collective load data includes the first load data. The collective load data includes current and predicted loads. The collective load data is in a form of a numerical value that represents available bandwidth of the LAG. In response to determining the sustainability factor is below or equal to the predetermined threshold, the operations further include sending a first command to activate the particular physical Ethernet link of the plurality of physical Ethernet links in the LAG. In response to determining the sustainability factor is above the predetermined threshold, the operations further include sending a second command to de-power the particular physical Ethernet link of the plurality of physical Ethernet links in the LAG. The operations further include advertising, using Border Gateway Protocol (BGP) Route-type 4, a plurality of extended community values of the LAG over the network.

In one or more embodiments, a computer-implemented method may include determining collective load data from a plurality of EVPN leaf nodes in a Link Aggregation Group (LAG) within a network, the LAG including a plurality of physical Ethernet links. The computer-implemented method further includes distributing the collective load data between the plurality of EVPN leaf nodes in the LAG. The computer-implemented method further includes determining, using a de-powering algorithm, a sustainability factor for a particular physical Ethernet link of the plurality of physical Ethernet links in the LAG. The computer-implemented method further includes determining whether to activate or de-power the particular physical Ethernet link in response to comparing the sustainability factor to a predetermined threshold.

In one or more embodiments, the particular physical Ethernet link is associated with a particular EVPN leaf node of the plurality of EVPN leaf nodes. The computer-implemented method further includes calculating first load data of a particular EVPN leaf node of the plurality of EVPN leaf nodes in a distributed mode by using interface statistics and flow data associate with one or more interfaces of the particular EVPN leaf node. The computer-implemented method further includes receiving first load data of a particular EVPN leaf node in a centralized mode by requesting the first load data of the particular EVPN leaf node from an assurance engine. The collective load data includes the first load data. The collective load data includes current and predicted loads. The collective load data is in a form of a numerical value that represents available bandwidth of the LAG. In response to determining the sustainability factor is below or equal to the predetermined threshold, the computer-implemented method further includes sending a first command to activate the particular physical Ethernet link of the plurality of physical Ethernet links in the LAG. In response to determining the sustainability factor is above the predetermined threshold, the computer-implemented method further includes sending a second command to de-power the particular physical Ethernet link of the plurality of physical Ethernet links in the LAG. The computer-implemented method further includes advertising, using Border Gateway Protocol (BGP) Route-type 4, a plurality of extended community values of the LAG over the network.

In one or more embodiments, a non-transitory computer-readable medium may include instructions that are configured, when executed by a processor, to perform operations. The operations include determining collective load data from a plurality of EVPN leaf nodes in a LAG within a network, the LAG including a plurality of physical Ethernet links. The operations further include distributing the collective load data between the plurality of EVPN leaf nodes in the LAG. The operations further include determining, using a de-powering algorithm, a sustainability factor for a particular physical Ethernet link of the plurality of physical Ethernet links in the LAG. The operations further include determining whether to activate or de-power the particular physical Ethernet link in response to comparing the sustainability factor to a predetermined threshold.

In one or more embodiments, the particular physical Ethernet link is associated with a particular EVPN leaf node of the plurality of EVPN leaf nodes. The operations further include calculating first load data of a particular EVPN leaf node of the plurality of EVPN leaf nodes in a distributed mode by using interface statistics and flow data associate with one or more interfaces of the particular EVPN leaf node. The operations further include receiving first load data of a particular EVPN leaf node in a centralized mode by requesting the first load data of the particular EVPN leaf node from an assurance engine. The collective load data includes the first load data. The collective load data includes current and predicted loads. The collective load data is in a form of a numerical value that represents available bandwidth of the LAG. In response to determining the sustainability factor is below or equal to the predetermined threshold, the operations further include sending a first command to activate the particular physical Ethernet link of the plurality of physical Ethernet links in the LAG. In response to determining the sustainability factor is above the predetermined threshold, the operations further include sending a second command to de-power the particular physical Ethernet link of the plurality of physical Ethernet links in the LAG. The operations further include advertising, using Border Gateway Protocol (BGP) Route-type 4, a plurality of extended community values of the LAG over the network.

Technical advantages of certain embodiments of this disclosure may include one or more of the following. Certain embodiments of this disclosure provide a power saving capability for various Ethernet links in EVPN LAG multi-homing. For example, certain embodiments provide sustainability enhancements which save power by de-energizing some ports in EVPN LAG when the traffic is low during off business hours and/or when not all links are actively used. As another example, certain embodiments described herein determine a sustainability factor to detect one or more Ethernet links when the traffic for the plurality of Ethernet links is low in EVPN LAGs. In some embodiments, the sustainability factor may be used to determine whether to selectively de-power or activate particular Ethernet links in a centralized mode or a distributed mode in EVPN fabric solutions. In some embodiments, each EVPN leaf node may learn about a current or predicted load on its local EVPN ESI EtherChannel physical links and share the load information with other EVPN leaf nodes configured with the same EVPN ESI EtherChannel, which increases the efficiency of the system.

Other technical advantages will be readily apparent to one skilled in the art from the following figures, descriptions, and claims. Moreover, while specific advantages have been enumerated above, various embodiments may include all, some, or none of the enumerated advantages.

EXAMPLE EMBODIMENTS

In certain embodiments, EVPN LAG multihoming provides a key tool to connect an end-point device to more than one EVPN leaf node in order to increase overall redundancy and network resiliency. Link aggregation may address the following problems with Ethernet connections: bandwidth limitations and lack of resilience. For example, a mandatory attribute ESI may be configured on multiple EVPN leaf nodes to which a single end-point device is connected, to enable a "single-active" or "all-active" link LAG scenario. Thus, link aggregation may aggregate multiple network connections in parallel in order to increase throughput beyond what a single connection could sustain, and to provide redundancy in case one of the links should fail. In some embodiments, a LAG may combine a number of physical ports together to make a single high-bandwidth data path, so as to implement the traffic load sharing among the member ports in the group and to enhance the connection reliability.

Certain embodiments may use a port link aggregation technology or port-channel architecture (e.g., EtherChannel). The port link aggregation technology may allow the grouping of several physical Ethernet links in an EVPN LAG to create one logical Ethernet link for the purpose of providing fault-tolerance and high-speed links between switches, routers, and servers. The port link aggregation technology may be used in a backbone network and/or used to connect end-user machines. Traditional power saving methods may distribute load data across multiple aggregated links in the LAG based on information included in the headers of the Ethernet packets sent across the links to select one of the multiple links. Thus, all the links in the EVPN LAG are in a full or near full power state when the traffic is high for peak loads, such as max loads, peak time of web surfing, backup, etc. However, when the aggregated links in the EVPN LAG are not fully utilized, the aggregated links in the LAG may be in a low power, standby mode.

In some embodiments, the disclosed power saving control system may provide efficient energy savings across the EVPN LAG by determining a sustainability factor to detect one or more Ethernet links when the traffic for the plurality of Ethernet links is low in the EVPN LAG. In some embodiments, the sustainability factor may be used to selectively de-power or activate particular Ethernet links in a centralized mode or a distributed mode in EVPN fabric solutions. In some embodiments, each EVPN leaf node may learn about a current or predicted load on its local EVPN ESI EtherChannel physical links and share the load information with other EVPN leaf nodes configured with the same EVPN ESI EtherChannel. Furthermore, the disclosed power saving control system may leverage Border Gateway Protocol (BGP) extended communities by considering a configuration chassis and multiple local connectors (LC). For example, a power class may be generated based on the line card power consumption where the ESI port link aggregation technology is terminated. Thus, the disclosed power saving control system may be configured to advertise extended community values using BGP Route-type 4, which are imported by ESI members. When a Route Targets (RT) range is received that is lower than the local value derived, then ports on the local node may be put into power-saving mode. As a result, the disclosed power saving control system may provide significant sustainability enhancements which allow for saving power by de-energizing some ports in EVPN LAG when the traffic is low during off business hours and/or not all links are actively used.

FIG. 1 illustrates an EVPN network 100 for determining sustainability factors for Ethernet links, in accordance with certain embodiments. EVPN network 100 may be configured to use BGP Multiprotocol Label Switching (MPLS)-based EVPN functionality to achieve multihoming between a provider edge device, such as an EVPN spine, and a customer edge device, such as an EVPN leaf node. In particular, EVPN network 100 may represent a standard three-stage spine-leaf underlay architecture, which has a spine layer and a leaf node layer. The spine layer includes two spine switches, such as spines 110 and 120. The leaf node layer includes four leaf node switches, such as leaf nodes 132, 134, 136, and 138. A device 140, such as a server, a battery managing system (BMS), a router, a gateway, a switch, etc., may be connected to one or more leaf nodes, such as leaf nodes 132, 134, and 136. Thus, the aggregated links associated with the device 140 may form an EVPN LAG 150 to make a single high-bandwidth data path. The EVPN network 100 may distribute and load balance the Ethernet packets between the set of links in the EVPN LAG 150 by implementing the traffic load sharing among the member ports in the group and to enhance the connection reliability.

In some embodiments, the EVPN LAG 150 may be identified using an ESI. In certain embodiments, an ESI is required to allow EVPN LAG server multihoming. The EVPN network 100 may use a structured ESI assignment method to simplify network administration. In particular, the EVPN LAG 150 may be used to collect one or more links 122, such Ethernet links, in the EVPN network 100 as a bundle and assign a corresponding ESI to the bundled links. For example, Ethernet links from multiple standalone nodes may be assigned into the same ESI. The EVPN LAG 150 may introduce node level redundancy to devices in the EVPN network 100. As another example, an ESI value may be encoded as a 10-byte integer and used to identify a multihoming segment. The same ESI value allowed on multiple leaf switch interfaces and connected to the same device, such as the device 140, forms the EVPN LAG 150. This EVPN LAG 150 may support active-active multihoming towards the connected device 140. As another example, the ESI value may use the same values for the first eight bytes and use different values in the ninth and tenth bytes based on the corresponding EVPN LAG 150. Thus, the EVPN network 100 may be configured to manage a plurality of EVPN LAGs 150 using BGP Route-type 4 for all the connected ESI members in EVPN multihoming.

In some embodiments, the spine layer and the leaf node layer may be connected in the full mesh topology in which all the switches are interconnected to each other within a network. Thus, each switch not only sends its own signals but also relays data from other switches. The nodes are connected to each other via a dedicated link during which information travels from node to node. Every node features a point-to-point connection to the opposite node. The connections within the mesh are often wired or wireless via network 160. In particular, the leaf node layer may be dependent on EVPN LAGs 150 which provide full active-active link support. For example, the EVPN LAG 150 may be frequently activated to ensure support for devices accessing the device 140, such as a data center, in EVPN multihoming. As a result, the device 140 may be connected to leaf nodes 132, 134, and 136 as the device 140 is connected to a single networking device.

This disclosure contemplates any suitable network 160. Network 160 broadly represents any wireline or wireless network, using any of satellite or terrestrial network links, such as public or private cloud on the Internet, ad hoc networks, local area networks (LANs), metropolitan area networks (MANs), wireless LANs (WLANs), wide area networks (WANs), wireless WANs (WWANs), public switched telephone networks (PSTNs), campus networks, internetworks, cellular telephone networks, or combinations thereof. The network 160 may include the public internet, networked server computers that implement Web2 and/or Web3 technologies, intranets, extranets, VPNs, a public switched telephone network (PSTN), and the like. Network 160 may include or be part of one or more other networks.

In some embodiments, links 122 may connect different nodes in the EVPN network 100, such as spine switch 110, spine switch 120, leaf node 132, leaf node 134, leaf node 136, leaf node 138, and device 140, to communication network 160 or to each other. This disclosure contemplates any suitable links 122. In particular embodiments, one or more links 122 include one or more wireline (e.g., Digital Subscriber Line (DSL) or Data Over Cable Service Interface Specification (DOCSIS)), wireless (e.g., Wi-Fi or Worldwide Interoperability for Microwave Access (WiMAX)), or optical (e.g., Synchronous Optical Network (SONET) or Synchronous Digital Hierarchy (SDH)) links. In particular embodiments, one or more links 122 be associated with an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 122, a combination of two or more such links 122, and the like. Links 122 need not necessarily be the same throughout the EVPN network 100. One or more first links 122 may differ in one or more respects from one or more second links 122.

Although FIG. 1 illustrates a particular number of spines 110 and 120, links 122, leaf nodes 132, 134, 136, and 138, devices 140, EVPN LAGs 150, and networks 160, this disclosure contemplates any suitable number of spines 110 and 120, links 122, leaf nodes 132, 134, 136, and 138, devices 140, EVPN LAGs 150, and networks 160. For example, leaf node 132 may be connected to more than one device 140.

Although FIG. 1 illustrates a particular arrangement of spines 110 and 120, links 122, leaf nodes 132, 134, 136, and 138, device 140, EVPN LAG 150, and networks 160, this disclosure contemplates any suitable arrangement of spines 110 and 120, links 122, leaf nodes 132, 134, 136, and 138, device 140, EVPN LAG 150, and networks 160.

Although FIG. 1 describes and illustrates particular components, devices, or systems carrying out particular actions, this disclosure contemplates any suitable combination of any suitable components, devices, or systems carrying out any suitable actions.

Figure 2:
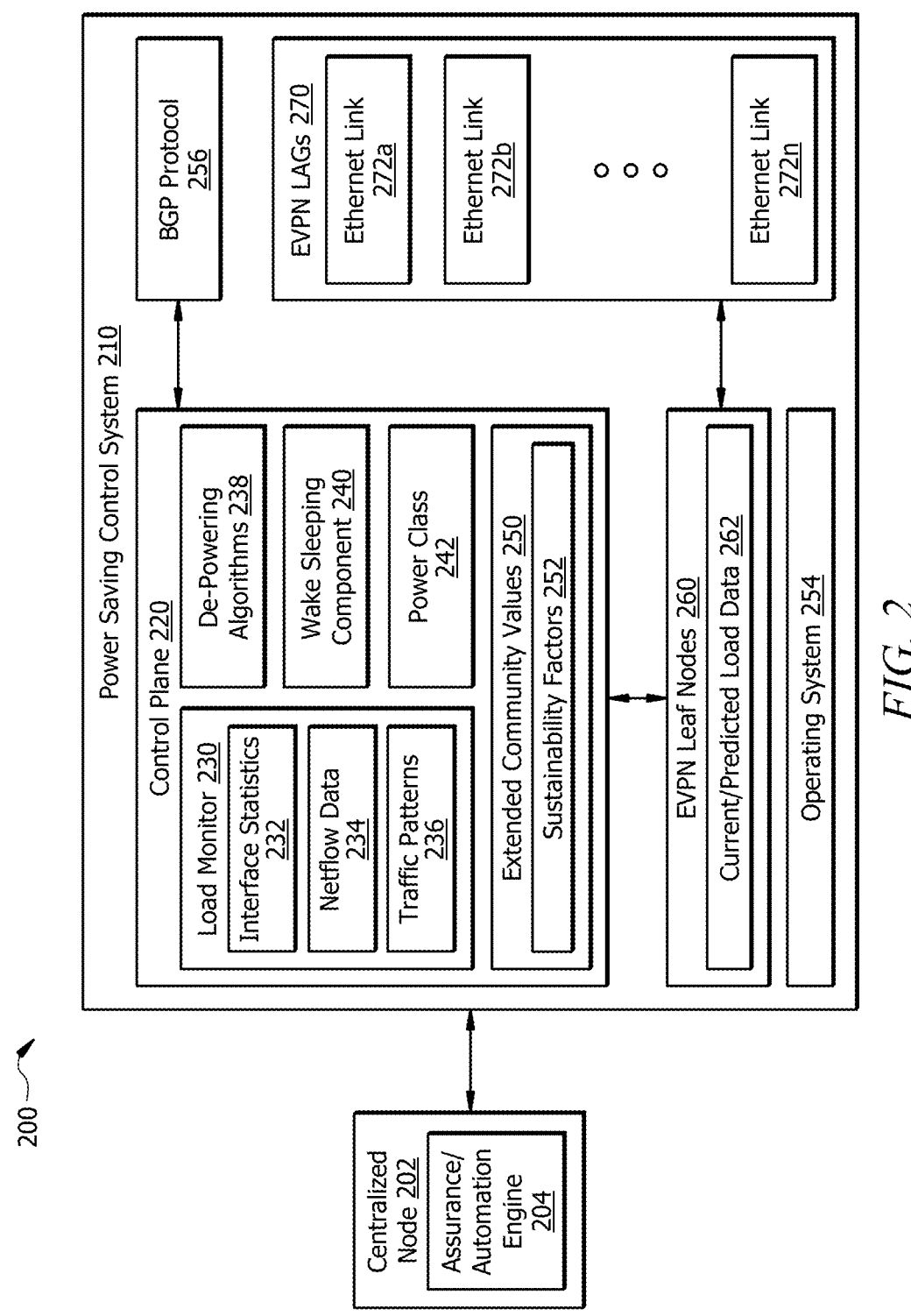
FIG. 2 illustrates a power saving control system that may be used by the EVPN network of FIG. 1, in accordance with certain embodiments.

FIG. 2 illustrates a power saving control system 210 in an EVPN LAG multihoming environment 200, in accordance with certain embodiments. The power saving control system 210 of FIG. 2 may be used by the EVPN network 100 of FIG. 1. In some embodiments, the EVPN LAG multihoming system 200 may include a centralized node 202 and a power saving control system 210. In some embodiments, the centralized node 202 may include an assurance/automation engine 204 which may be configured to determine information of current/further link utilization, such as assurance data and user configuration. In some embodiments, the power saving control system 210 may include a control plane 220, an operating system 254, a BGP protocol, a plurality of EVPN leaf nodes 260, and a plurality of EVPN LAGs 270. Each of the plurality of EVPN leaf nodes 260 may be connected with one or more devices, such as data servers, via a plurality of Ethernet links 272a-272n. In some embodiments, the power saving control system 210 may be configured to implement an operating system 254 to determine the plurality of EVPN LAGs 270 to bundle the plurality of Ethernet links 272a-272n and assign a corresponding ESI to the bundled links for each of the plurality of EVPN LAGs 270. Thus, the power saving control system 210 may be configured to save power by de-energizing some ports in the plurality of EVPN LAGs 270 when the traffic is low during off business hours and/or not all Ethernet links 272a-272n are actively used.

In some embodiments, the power saving control system 210 may be configured to implement the control plane 220 to detect one or more Ethernet links which are ready for de-powering or activation in EVPN LAG multihoming environment 200. The control plane 220 may be configured to use a load monitor 230 to obtain bandwidth utilization of the plurality of Ethernet links 272a-272n in the EVPN LAGs 270. Based upon the bandwidth utilization of the plurality of Ethernet links 272a-272n, the load monitor 230 may calculate current/predicted load data 262 for each of the plurality of EVPN leaf nodes 260. For example, the load monitor 230 may be used to determine a current load of an EVPN leaf node 260 for the plurality of EVPN LAGs 270. As another example, the load monitor 230 may be used to determine a predicted load of the EVPN leaf node 260 for the plurality of EVPN LAGs 270. The information of the current/predicted load data 262 may be in the form of a numerical value, a percentage value of overall available bandwidth, or shared in any other suitable discrete manner. As another example, the current/predicted load data 262 may include a plurality of percentage values of overall available bandwidth for different buckets which are defined based on the predicted utilization, such as bucket 1:0-20%, bucket 2:20-50%, bucket 3:50-70%, and bucket 4:70-100%.

In some embodiments, the control plane 220 may be configured to determine the current/predicted load data 262 for each of the plurality of EVPN leaf nodes 260 in a distributed mode of EVPN LAG multihoming environment 200. In the distributed mode, each of the plurality of EVPN leaf nodes 260 may independently calculate the current/predicted load data 262 which includes a current load and/or a predicted load in the near future by monitoring the bandwidth utilization of the plurality of Ethernet links 272a-272n associated with the plurality of EVPN leaf nodes 260. In particular, the control plane 220 may use a de-powering algorithm 238 to determine a sustainability factor 252, such as an RT, for a respective physical Ethernet link in the plurality of EVPN LAGs 270. In some embodiments, the control plane 220 may use the de-powering algorithm 238 to determine a sustainability factor 252 for each of the plurality of EVPN leaf nodes 260. For example, the load monitor 230 may be used to monitor the interface statistics 232 and/or flow data 234 (e.g., Netflow data) on the interfaces that belong to EVPN LAG Multihoming solution for each of the plurality of EVPN leaf nodes 260 which are connected to the plurality of Ethernet links 272a-272n. The control plane 220 may be used to exchange the information of the current/predicted load data 262 between the plurality of EVPN leaf nodes 260 by leveraging ESI extended communities to provide a larger range for grouping or categorizing communities.

In some embodiments, the control plane 220 may be configured to determine the current/predicted load data 262 for each of the plurality of EVPN leaf nodes 260 in a centralized mode of EVPN LAG multihoming environment 200. In the centralized mode, the control plane 220 may be used to perform two modes of operations: 1) a pull model scenario and 2) a push model scenario. In some embodiments, in the pull model scenario, the control plane 220 may be used to request data from the centralized node 202 to obtain enriched data about traffic patterns 236. For example, the centralized node 202 may use an assurance/automation engine 204 to calculate the traffic patterns 236 for each of the plurality of EVPN leaf nodes 260 based on one or more artificial intelligence (AI) or machine learning (ML) models. The control plane 220 may be used to receive the traffic patterns 236 for each of the plurality of EVPN leaf nodes 260 to calculate the current/predicted load data 262 which includes a current load and/or a predicted load in the near future by monitoring the bandwidth utilization of the plurality of Ethernet links 272a-272n associated with the plurality of EVPN leaf nodes 260. In particular, the control plane 220 may use a de-powering algorithm 238 to determine a sustainability factor 252, such as an RT, for a respective physical Ethernet link in the plurality of EVPN LAGs 270. In some embodiments, the control plane 220 may use the de-powering algorithm 238 to determine a sustainability factor 252 for each of the plurality of EVPN leaf nodes 260. The control plane 220 may be used to exchange the information of the current/predicted load data 262 between the plurality of EVPN leaf nodes 260 by leveraging extended community values 250 to provide a larger range for grouping or categorizing communities.

In some embodiments, in the push model scenario, the control plane 220 may be used to load information about the current/predicted load data 262 from the centralized node 202. In particular, the centralized node 202 may use the assurance/automation engine 204 to directly push the current/predicted load data 262 to each of the plurality of EVPN leaf nodes 260. In some embodiments, the control plane 220 may use a de-powering algorithm 238 to determine a sustainability factor 252, such as an RT, for a respective physical Ethernet link in the plurality of EVPN LAGs 270. In certain embodiments, the control plane 220 may use the de-powering algorithm 238 to determine a sustainability factor 252 for each of the plurality of EVPN leaf nodes 260. For example, an EVPN leaf node 260 may receive information about one or more links associated with the EVPN leaf node 260. The control plane 220 may be used to exchange the information of the current/predicted load data 262 between the plurality of EVPN leaf nodes 260 by leveraging extended communities via BGP. As another example, an EVPN leaf node 260 may receive information about one or more links associated with the EVPN leaf node as well as other links that form the EVPN LAG multihoming environment 200. As a result, BGP exchange may not be required as all information may be shared via described out-of-band.

In some embodiments, after each of the plurality of EVPN leaf nodes 260 determines current/predicted load data 262 on a corresponding plurality of local EVPN ESI physical links, the control plane 220 may be used to share the current/predicted load data 262 with all other EVPN leaf nodes where a specific ESI port aggregation technology (e.g., EtherChannel) is configured. For example, the control plane 220 may be configured to pass the current/predicted load data 262 by leveraging the BGP protocol 256 that is already used in EVPN fabric and share the current/predicted load data 262 with other EVPN leaf nodes by leveraging extended community values 250.

In some embodiments, an extended community value 250 is an 8-octet value that is divided into two main sections. The first two octets of the extended community value 250 encode a type field while the last six octets carry a unique set of data in a format defined by the type field. Thus, the control plane 220 may be configured to filter traffic by creating an extended BGP community list to efficiently control outbound routes. In particular, the control plane 220 may be used to create a power class 242 based on the line card power consumption where ESI port aggregation technology is terminated. The line card power consumption may include power consumption from greener sources for chassis and LC, as well as a corresponding BGP extended community value 250 derived from the power consumption. The control plane 220 may be used to advertise a plurality of extended community values 250 using BGP Route-type 4 which are imported by one or more ESI members.

In some embodiments, the sustainability factor 252 may be added to ESI extended community values 250 or used as a separated extended community value 250 which is responsible for sharing information about current/predicted link utilization depending on the implementation of the extended communities. For example, when a received RT range for an EVPN leaf node is less than a local value derived, such as a corresponding sustainability factor 252 associated with the EVPN leaf node 260, the control plane 220 may be configured to use a wake sleeping component 240 to put one or more ports on the EVPN leaf node 260 into a power saving mode. As another example, when a received RT range for an Ethernet link 272 or an EVPN LAG 270 is less than a corresponding sustainability factor 252 associated with the Ethernet link 272 or the EVPN LAG 270, the control plane 220 may be configured to use the wake sleeping component 240 to put the Ethernet link 272 or the EVPN LAG 270 into a power saving mode. Other enhancement logic may be used to modify the traffic statistics metric to adjust the sustainability factor 252 associated with the plurality of EVPN leaf nodes 260, EVPN LAGs 270, and/or Ethernet links 272a-272n. Therefore, the control plane 220 may use BGP and the sustainability factor 252 to constrain routing updating by limiting the number of VPN routes and describing VPN membership. Thus, the control plane 220 may provide considerable savings in Central Processing Unit (CPU) cycles and transient memory usage.

In some embodiments, the control plane 220 may be configured to determine whether to activate or de-power a physical Ethernet link 272 by comparing a respective sustainability factor 252 to a predetermined threshold. In particular, the control plane 220 may be used to determine a power configuration for a port, such as one of the plurality of EVPN leaf nodes 260 and/or the plurality of Ethernet links 272a-272n in the EVPN LAGs 270. The power configuration may include a single power mode configuration, a power saving mode configuration, a power activation mode configuration, and the like. In some embodiments, the control plane 220 may be configured to determine a single power mode configuration for a port when the port is in a regular operating mode. In some embodiments, the control plane 220 may be configured to determine a power saving mode configuration for a port when a respective sustainability factor 252 associated with the port is below a predetermined threshold, such as an RT range received by the port. The power saving model configuration may include a power-off mode, a sleep mode, a reduced voltage mode, a reduced frequency mode, and the like, that has a reduced power consumption. For example, when a port enters a sleep mode, hardware components of the port are powered off most of the time and are powered on periodically for a short time in order to save power. As another example, when a port enters a reduced frequency mode, for example when the full transmit capability of the port is not required, a transmitting portion of the port operates at a reduced frequency, such as one tenth of a regular frequency, to save power. In some embodiments, the control plane 220 may be configured to determine a power activating mode configuration for a port when a respective sustainability factor 252 associated with the port is below a predetermined threshold, such as an RT range received by the port.

Although FIG. 2 illustrates a particular number of EVPN LAG multihoming environments 200, centralized nodes 202, assurance/automation engines 204, power saving control systems 210, control planes 220, load monitors 230, interface statistics 232, flow data 234, traffic patterns 236, de-powering algorithms 238, wake sleeping components 240, power classes 242, extended community values 250, sustainability factors 252, EVPN leaf nodes 260, current/predicted load data 262, operating systems 254, BGP protocols 256, EVPN LAGs 270, and Ethernet links 272a-272n, this disclosure contemplates any suitable number of centralized nodes 202, assurance/automation engines 204, power saving control systems 210, control planes 220, load monitors 230, interface statistics 232, flow data 234, traffic patterns 236, de-powering algorithms 238, wake sleeping components 240, power classes 242, extended community values 250, sustainability factors 252, EVPN leaf nodes 260, current/predicted load data 262, operating systems 254, BGP protocols 256, EVPN LAGs 270, and Ethernet links 272a-272n. For example, the power saving control system 210 may be connected to more than one centralized node 202.

Although FIG. 2 illustrates a particular arrangement of EVPN LAG multihoming environment 200, centralized node 202, assurance/automation engine 204, power saving control system 210, control plane 220, load monitor 230, interface statistics 232, flow data 234, traffic patterns 236, de-powering algorithms 238, wake sleeping component 240, power class 242, extended community values 250, sustainability factors 252, EVPN leaf nodes 260, current/predicted load data 262, operating system 254, BGP protocol 256, EVPN LAGs 270, and Ethernet links 272a-272n, this disclosure contemplates any suitable arrangement of EVPN LAG multihoming environment 200, centralized node 202, assurance/automation engine 204, power saving control system 210, control plane 220, load monitor 230, interface statistics 232, flow data 234, traffic patterns 236, de-powering algorithms 238, wake sleeping component 240, power class 242, extended community values 250, sustainability factors 252, EVPN leaf nodes 260, current/predicted load data 262, operating system 254, BGP protocol 256, EVPN LAGs 270, and Ethernet links 272a-272n.

Although FIG. 2 describes and illustrates particular components, devices, or systems carrying out particular actions, this disclosure contemplates any suitable combination of any suitable components, devices, or systems carrying out any suitable actions. For example, the power saving control system may be connected to one or more centralized nodes 202.

Figure 3:
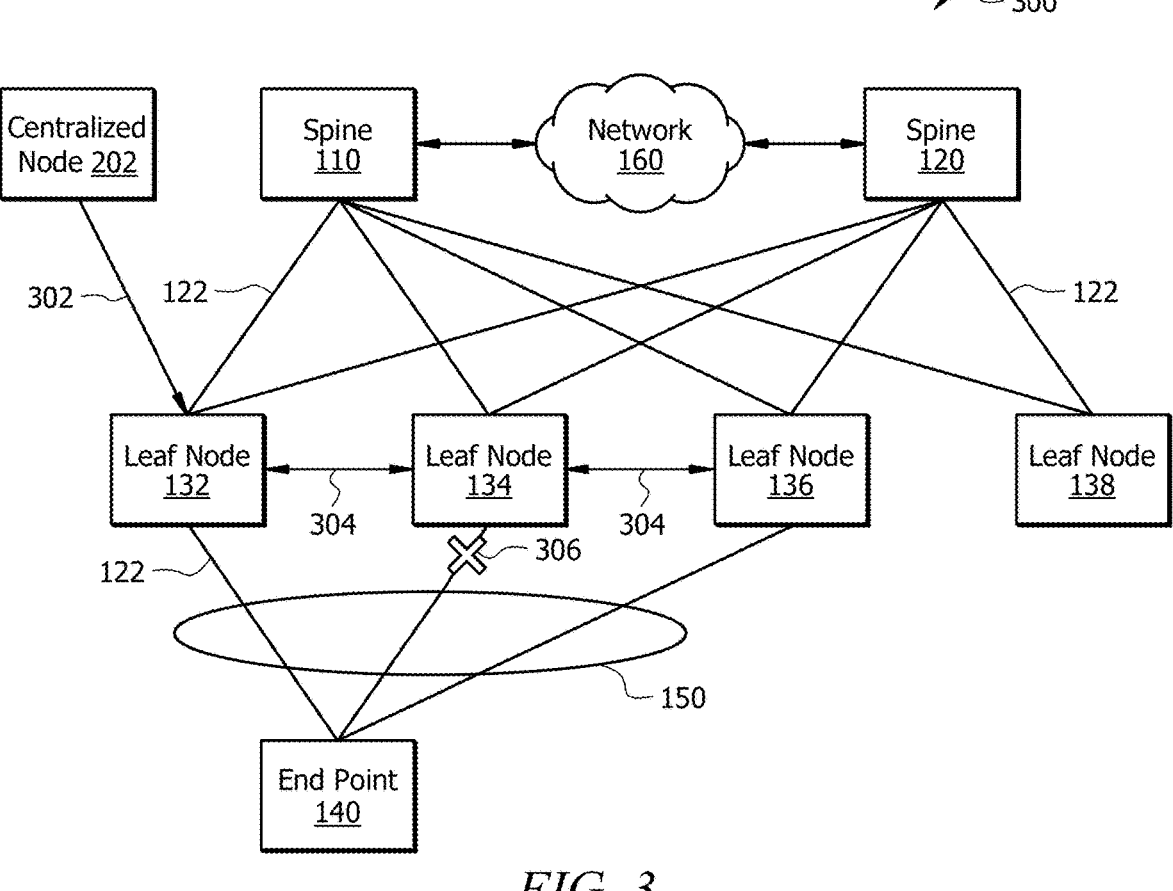
FIG. 3 illustrates a power saving EVPN network that may be used by the EVPN network of FIG. 1, in accordance with certain embodiments.

FIG. 3 illustrates a power-saving EVPN network 300 that may be used by the EVPN network of FIG. 1. The power-saving EVPN network 300 include a spine layer which includes spine 110 and spine 120 and a leaf node layer which includes leaf node 132, leaf node 134, leaf node 136, and leaf node 138. The spine layer and the leaf node layer may be connected in a full mesh topology in which all the switches are interconnected via links 122. Thus, each switch not only sends its own signals but also relays data from other switches. The nodes are connected to each other via a dedicated link during which information travels from node to node. Every node features a point-to-point connection to the opposite node. The connections within the mesh are often wired or wireless via network 160. In particular, the leaf node layer may be dependent on EVPN LAGs 150 which provide full active-active link support. For example, the EVPN LAG 150 may be frequently activated to ensure support for devices accessing the device 140, such as a data center, in an EVPN multihoming environment. As a result, the device 140 may be connected to leaf nodes 132, 134, and 136 via links 122 as the device 140 is connected to a single networking device.

In some embodiments, for an EVPN leaf node 132, 134, or 136 associated with the EVPN LAG 150, the EVPN leaf node 132, 134, or 136 may determine a corresponding current/future load in a distributed mode or in a centralized mode. In particular, the EVPN leaf node 132, 134, or 136 may use a de-powering algorithm (e.g., de-powering algorithm 238 of FIG. 2) to determine a sustainability factor (e.g., sustainability factor 252 of FIG. 3) for a respective physical Ethernet link of the plurality of physical Ethernet links in the EVPN LAG 150. As a result, the EVPN leaf node 132, 134, or 136 may determine whether to activate or de-power the respective physical Ethernet link in response to comparing the sustainability factor to a predetermined threshold. For example, in a distributed mode, EVPN leaf node 132 may locally determine information on current/future link utilization by independently calculating a current/predicted load using the interface statistics and/or flow data (e.g., flow data 234 of FIG. 3) on the interfaces that belong to EVPN LAG multihoming environment. The information of current/future link utilization for EVPN leaf node 132 may passed to other EVPN nodes 134 and 136 in the same EVPN LAG 150 where the same ESI port aggregation technology (e.g., EtherChannel) is configured, via a BGP protocol 304. As another example, in a centralized mode, the centralized node 202 may centrally determine information about current/future link utilization for EVPN leaf node 132 by using an ML algorithm, assurance data, user configuration, etc. Thus, the centralized node 202 may send the information about current/future link utilization for EVPN leaf node 132 to EVPN leaf node 132. The information of current/future link utilization for EVPN leaf node 132 may passed to other EVPN nodes 134 and 136 in the same EVPN LAG 150 where the same ESI port aggregation technology is configured, via the BGP protocol 304. EVPN leaf node 134 may determine a sustainability factor for the Ethernet link 306. In response to determining that the sustainability factor for the Ethernet link 306 is above a predetermined threshold, such as a received RT value, EVPN leaf node 134 may make a decision to de-power the local Ethernet link 306 in a power saving mode.

FIG. 4 illustrates a method 400 for de-powering or activating an Ethernet link in an EVPN LAG multihoming environment, in accordance with certain embodiments. Method 400 of FIG. 4 may be used by power saving control system 210 of FIG. 2. Method 400 starts at step 405, where power saving control system 210 (referring to FIG. 2) may determine load data from a plurality of EVPN leaf nodes in a LAG within a network. The LAG may include one or more physical Ethernet links. For example, the power saving control system 210 (referring to FIG. 2) may locally determine the load data from the plurality of EVPN leaf nodes in the LAG in a distributed mode by independently calculating a current/predicted load using the interface statistics and/or flow data on the interfaces which belong to EVPN LAG multihoming environment. As another example, the power saving control system 210 (referring to FIG. 2) may receive the load data from the plurality of EVPN leaf nodes in the LAG in a centralized mode using a centralized node which centrally determines information about current/future link utilization for the plurality of EVPN leaf nodes in the LAG by using an ML algorithm, assurance data, user configuration, etc.

At step 410, the power saving control system 210 (referring to FIG. 2) may distribute the load data between the plurality of EVPN leaf nodes in the LAG. The power saving control system 210 (referring to FIG. 2) may share the information of current/future link utilization for the plurality of EVPN leaf nodes in the LAG for all the EVPN nodes in the same LAG where the same ESI port aggregation technology (e.g., EtherChannel) is configured, via a BGP protocol by leveraging extended community values (e.g., extended community values 250 of FIG. 2). The power saving control system 210 (referring to FIG. 2) may advertise the extended community values using BGP Route-type 4 which are imported by ESI members.

At step 415, the power saving control system 210 (referring to FIG. 2) may determine, using a de-powering algorithm, a sustainability factor (e.g., sustainability factor 252 of FIG. 2) for a respective physical Ethernet link of the plurality of physical Ethernet links in the LAG. The sustainability factor may be determined using respective current/predicted load data (e.g., current/predicted load data 262 of FIG. 2) for the respective physical Ethernet link of the plurality of physical Ethernet links in the LAG. For example, the sustainability factor may be determined using a statistical method and/or an ML algorithm.

At step 420, the power saving control system 210 (referring to FIG. 2) may compare the sustainability factor to a predetermined threshold. The predetermined threshold may be an RT range for a respective physical Ethernet link of one or more physical Ethernet links in the LAG.

At step 425, a determination is made whether the sustainability factor is above the predetermined threshold. Where the sustainability factor is above the predetermined threshold, the process may proceed to step 430. Where the sustainability factor is not above the predetermined threshold, the process may proceed to step 435. At step 430, the power saving control system 210 (referring to FIG. 2) may send a command to de-power the respective physical Ethernet link. At step 435, the power saving control system 210 (referring to FIG. 2) may send a command to activate the respective physical Ethernet link.

Particular embodiments may repeat one or more steps of the method of FIG. 4, where appropriate. Although this disclosure describes and illustrates particular steps of the method of FIG. 4 as occurring in a particular order, this disclosure contemplates any suitable steps of the method of FIG. 4 occurring in any suitable order. Moreover, although this disclosure describes and illustrates an example method to de-power or activate one or more physical Ethernet links, including the particular steps of the method of FIG. 4, this disclosure contemplates any suitable method including any suitable steps, which may include all, some, or none of the steps of the method of FIG. 4, where appropriate. Furthermore, although this disclosure describes and illustrates particular components, devices, or systems carrying out particular steps of the method of FIG. 4, this disclosure contemplates any suitable combination of any suitable components, devices, or systems carrying out any suitable steps of the method of FIG. 4.

Figure 5:
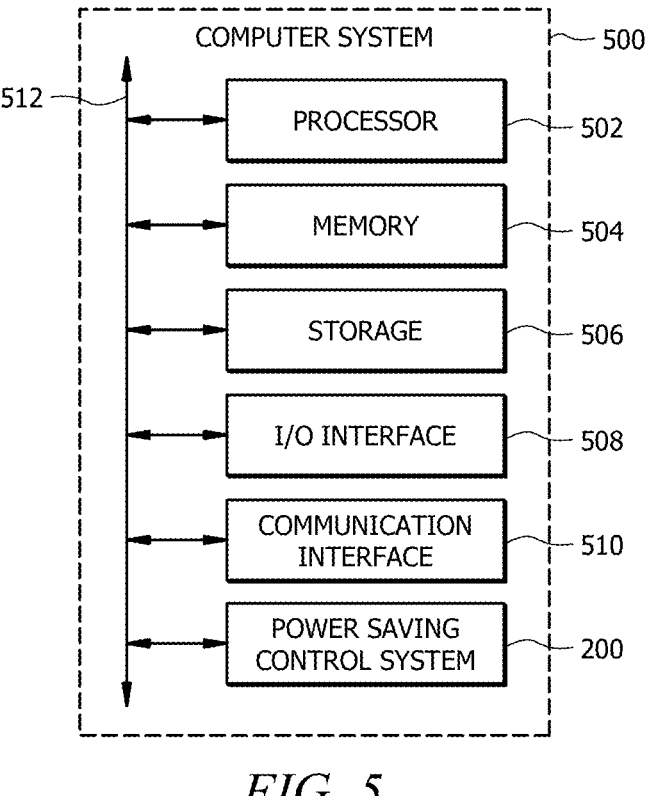
FIG. 5 illustrates a computer system, in accordance with certain embodiments.

FIG. 5 illustrates an example computer system, in accordance with certain embodiments. In particular embodiments, one or more computer systems 500 perform one or more steps of one or more methods described or illustrated herein. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. Particular embodiments include one or more portions of one or more computer systems 500. Herein, reference to an information handling system may encompass a computer or a computing device, and vice versa, where appropriate. Moreover, reference to an information handling system may encompass one or more computer systems, where appropriate. Further, the power saving control system 210 in FIG. 2 may be incorporated into the illustrated computer system 500. With reference to the present disclosure, computer system 500 may be the aforementioned product incorporating power saving control system 210 in FIG. 2, as described above with respect to FIG. 2. As such, "product" and "computer system 500" may herein be used interchangeably.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 500 may include one or more computer systems 500; be unitary or distributed; span multiple locations; span multiple machines; span multiple data centers; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular information handling system having a particular number of particular components in a particular arrangement, this disclosure contemplates any suitable information handling system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memories 504, where appropriate. Although this disclosure describes and illustrates particular memory, this disclosure contemplates any suitable memory.

In particular embodiments, storage 506 includes mass storage for data or instructions. As an example and not by way of limitation, storage 506 may include a hard disk drive (HDD), a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both, providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer systems 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a Long-Term Evolution (LTE) network, or a 5G network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific Ics (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

In an embodiment, computer system 500 may be configured to implement a power saving control process (see FIG. 2) in order to de-power one or more physical Ethernet links. In an embodiment, computer system 500 may be configured to determine load data from a plurality of EVPN leaf nodes in a LAG within a network. The LAG includes one or more physical Ethernet links. In an embodiment, computer system 500 may be configured to distribute the load data between the plurality of EVPN leaf nodes in the LAG. In an embodiment, computer system 500 may be configured to determine, using a de-powering algorithm, a sustainability factor for a respective physical Ethernet link of the plurality of physical Ethernet links in in the LAG. In an embodiment, computer system 500 may be configured to determine whether to activate or de-power the respective physical Ethernet link in response to comparing the sustainability factor to a predetermined threshold.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The embodiments disclosed herein are only examples, and the scope of this disclosure is not limited to them. Particular embodiments may include all, some, or none of the components, elements, features, functions, operations, or steps of the embodiments disclosed herein. Embodiments disclosed herein include a method, an apparatus, a storage medium, a system and a computer program product, wherein any feature mentioned in one category, e.g., a method, can be applied in another category, e.g., a system, as well.

What is claimed is:

1. An apparatus, comprising:
one or more processors; and
one or more computer-readable non-transitory storage media comprising instructions that, when executed by the one or more processors, cause one or more components of the apparatus to perform operations comprising:
    determining collective load data from a plurality of Ethernet Virtual Private Network (EVPN) leaf nodes in a Link Aggregation Group (LAG) within a network, the LAG comprising a plurality of physical Ethernet links;
    distributing the collective load data between the plurality of EVPN leaf nodes in the LAG;
    determining, using a de-powering algorithm, a sustainability factor for a particular physical Ethernet link of the plurality of physical Ethernet links in the LAG; and
    determining whether to activate or de-power the particular physical Ethernet link in response to comparing the sustainability factor to a predetermined threshold.

2. The apparatus of claim 1, wherein the particular physical Ethernet link is associated with a particular EVPN leaf node of the plurality of EVPN leaf nodes.

3. The apparatus of claim 1, the operations further comprising:
calculating first load data for a particular EVPN leaf node of the plurality of EVPN leaf nodes in a distributed mode by using interface statistics and flow data associated with one or more interfaces of the particular EVPN leaf node, wherein the collective load data comprises the first load data.

4. The apparatus of claim 1, the operations further comprising:
receiving first load data of a particular EVPN leaf node in a centralized mode by requesting the first load data of the particular EVPN leaf node from an assurance engine, wherein the collective load data comprises the first load data.

5. The apparatus of claim 1, wherein:
the collective load data comprises current and predicted loads; and
the collective load data is in a form of a numerical value that represents available bandwidth of the LAG.

6. The apparatus of claim 1, the operations further comprising:
in response to determining the sustainability factor below or equal to the predetermined threshold, sending a first command to activate the particular physical Ethernet link of the plurality of physical Ethernet links in the LAG; and
in response to determining the sustainability factor is above the predetermined threshold, sending a second command to de-power the particular physical Ethernet link of the plurality of physical Ethernet links in the LAG.

7. The apparatus of claim 1, the operations further comprising:
advertising, using Border Gateway Protocol (BGP) Route-type 4, a plurality of extended community values associated with the LAG over the network.

8. A computer-implemented method, comprising:
determining collective load data from a plurality of Ethernet Virtual Private Network (EVPN) leaf nodes in a Link Aggregation Group (LAG) within a network, the LAG comprising a plurality of physical Ethernet links; distributing the collective load data between the plurality of EVPN leaf nodes in the LAG;

determining, using a de-powering algorithm, a sustainability factor for a particular physical Ethernet link of the plurality of physical Ethernet links in the LAG; and determining whether to activate or de-power the particular physical Ethernet link in response to comparing the sustainability factor to a predetermined threshold.

9. The computer-implemented method of claim 8, wherein the particular physical Ethernet link is associated with a particular EVPN leaf node of the plurality of EVPN leaf nodes.

10. The computer-implemented method of claim 8, further comprising:

calculating first load data for a particular EVPN leaf node of the plurality of EVPN leaf nodes in a distributed mode by using interface statistics and flow data associated with one or more interfaces of the particular EVPN leaf node, wherein the collective load data comprises the first load data.

11. The computer-implemented method of claim 8, further comprising:

receiving first load data of a particular EVPN leaf node in a centralized mode by requesting the first load data of the particular EVPN leaf node from a centralized node of an assurance engine, wherein the collective load data comprises the first load data.

12. The computer-implemented method of claim 8, wherein:

the collective load data comprises current and predicted loads; and the collective load data is in a form of a numerical value that represents available bandwidth of the LAG.

13. The computer-implemented method of claim 8, further comprising:

in response to determining the sustainability factor is below or equal to the predetermined threshold, sending a first command to activate the particular physical Ethernet link of the plurality of physical Ethernet links in the LAG; and in response to determining the sustainability factor is above the predetermined threshold, sending a second command to de-power the particular physical Ethernet link of the plurality of physical Ethernet links in the LAG.

14. The computer-implemented method of claim 8, further comprising:

advertising, using Border Gateway Protocol (BGP) Route-type 4, a plurality of extended community values associated with the LAG over the network.

15. A non-transitory computer-readable medium comprising instructions that are configured, when executed by a processor, to perform operations comprising:

Determining collective load data from a plurality of Ethernet Virtual Private Network (EVPN) leaf nodes in a Link Aggregation Group (LAG) within a network, the LAG comprising a plurality of physical Ethernet links;

distributing the collective load data between the plurality of EVPN leaf nodes in the LAG;

determining, using a de-powering algorithm, a sustainability factor for a particular physical Ethernet link of the plurality of physical Ethernet links in the LAG; and determining whether to activate or de-power the particular physical Ethernet link in response to comparing the sustainability factor to a predetermined threshold.

16. The non-transitory computer-readable medium of claim 15, wherein the particular physical Ethernet link is associated with a particular EVPN leaf node of the plurality of EVPN leaf nodes.

17. The non-transitory computer-readable medium of claim 15, wherein the instructions are further configured to perform operations further comprising:

calculating first load data for a particular EVPN leaf node of the plurality of EVPN leaf nodes in a distributed mode by using interface statistics and flow data associated with one or more interfaces of the particular EVPN leaf node.

18. The non-transitory computer-readable medium of claim 15, wherein the instructions are further configured to perform operations further comprising:

receiving first load data of a particular EVPN leaf node in a centralized mode by requesting the first load data of the particular EVPN leaf node from an assurance engine, wherein the collective load data comprises the first load data.

19. The non-transitory computer-readable medium of claim 15, wherein:

the collective load data comprises current and predicted loads; and the collective load data is in a form of a numerical value that represents available bandwidth of the LAG.

20. The non-transitory computer-readable medium of claim 15, wherein the instructions are further configured to perform operations further comprising:

in response to determining the sustainability factor is below or equal to the predetermined threshold, sending a first command to activate the particular physical Ethernet link of the plurality of physical Ethernet links in the LAG; and in response to determining the sustainability factor is above the predetermined threshold, sending a second command to de-power the particular physical Ethernet link of the plurality of physical Ethernet links in the LAG.

* * * * *